(12) United States Patent
Hill

(10) Patent No.: US 8,017,680 B2
(45) Date of Patent: Sep. 13, 2011

(54) RUBBER LATEX FILMS HAVING IMPROVED TEAR RESISTANCE

(75) Inventor: David Michael Hill, Bishops Stortford (GB)

(73) Assignee: LRC Products Limited, Slough, Berkshire (GB)

( * ) Notice: Subject to any disclaimer, the term of this patent is extended or adjusted under 35 U.S.C. 154(b) by 998 days.

(21) Appl. No.: 11/573,926

(22) PCT Filed: Aug. 18, 2005

(86) PCT No.: PCT/GB2005/003236
§ 371 (c)(1),
(2), (4) Date: May 25, 2007

(87) PCT Pub. No.: WO2006/018646
PCT Pub. Date: Feb. 23, 2006

(65) Prior Publication Data
US 2007/0254999 A1  Nov. 1, 2007

(30) Foreign Application Priority Data
Aug. 19, 2004  (GB) .................................. 0418561.7

(51) Int. Cl.
*C08K 3/34* (2006.01)
(52) U.S. Cl. ...................................................... 524/492
(58) Field of Classification Search .................. 524/492
See application file for complete search history.

(56) References Cited

U.S. PATENT DOCUMENTS
6,649,116 B2  11/2003  Stephenson et al.
2002/0149002 A1  10/2002  Womelsdorf et al.

FOREIGN PATENT DOCUMENTS
GB        529246       11/1940
GB        610728       10/1948
GB      1 285 479       8/1972
GB      2 088 389 A     6/1982
GB      2 321 902 A     8/1998
WO    WO 97/13805       4/1997

OTHER PUBLICATIONS

Lin et al., Accounts of Chemical Research vol. 35, No. 11, 2002.*
Degussa AG, "Aqueous AEROSIL® and Aluminium Oxide Dispersions," Technical Bulletin Pigments, No. 33 (Dec. 1982), Frankfurt, Germany, 21 pgs.
Esser, Dr. H., et al., Uber die Verstärkung von Naturlatex- und Syntheselatex-Filmen mit Kieselsolen, Kautschuk und Gummi, vol. 13, No. 5 (1960), The British Library, 126-132 WT (in German only).
Foreign communication from a related counterpart application—International Search Report, PCT/GB2005/003236, Oct. 11, 2005, 3 pages.
Foreign communication from a related counterpart application—International Preliminary Report on Patentability, PCT/GB2005/003236, Oct. 9, 2006, 7 pages.

* cited by examiner

*Primary Examiner* — David Wu
*Assistant Examiner* — Sonya Wright
(74) *Attorney, Agent, or Firm* — Ryan A. Schneider; Troutman Sanders LLP

(57) ABSTRACT

A method of making a rubber latex comprises providing a rubber latex and adding to the latex a solution of a reinforcing agent. Further, a method of making a reinforced rubber latex film comprises providing a rubber latex, adding to the latex a solution of a reinforcing agent, then forming a film from the latex. There is also provided a rubber latex comprising a solution of a reinforcing agent, which is preferably a solution of a water-soluble silicate. Rubber latex films and articles made therefrom are also provided.

16 Claims, 1 Drawing Sheet

Tear strength

US 8,017,680 B2

RUBBER LATEX FILMS HAVING IMPROVED TEAR RESISTANCE

CROSS-REFERENCE TO RELATED APPLICATIONS

This application is a filing under 35 U.S.C. 371 of International Application No. PCT/GB2005/003236 filed Aug. 18, 2005, entitled "Rubber Latex Films Having Improved Tear Resistance," claiming priority of United Kingdom Patent Application No. GB0418561.7 filed Aug. 19, 2004, which applications are incorporated by reference herein in their entirety.

FIELD OF THE INVENTION

This invention relates to rubber latex, and to rubber latex films having improved tear resistance, and to a method of making them. The invention also relates to compositions containing rubber latex.

BACKGROUND OF THE INVENTION

Thin rubber films, prepared by dipping shaped formers into a compounded latex and then heating to dry and vulcanise the latex deposit on the former, have been used for many years in applications for which their barrier properties have proved invaluable. Natural rubber latex has proved to be particularly useful in this respect since it gives films that are strong, highly deformable, and show good recovery on removal of stress. Such films have been used extensively for the manufacture of gloves for domestic, industrial, and surgical and general medical use, and for condoms and balloons. Particularly in medical applications, it is important that the film is impervious to blood, sperm, and other body fluids, and to micro-organisms, whilst at the same time being thin and flexible enough to allow sensitivity of touch and feel. Thin natural rubber latex films fulfil these requirements admirably and are in many ways ideal for such applications.

However, although these thin films are strong, they are subject to tearing and puncture by sharp objects; that is, if a defect is present or is formed in the film, it can act as an initiation site for tearing. Once initiated, a tear is likely to propagate readily, since the rubber in use is usually under strain. There is therefore a need to increase the resistance of a latex rubber film to tearing.

Many attempts have been made to improve the tear resistance of rubber films. One approach has been to incorporate into the rubber, very small particles of an immiscible, harder, less deformable material, capable of stopping or deflecting a growing tear. A convenient and effective way of achieving this is to mix the harder material, in the form of an aqueous dispersion, emulsion or second latex, with the rubber latex, prior to dipping the shaped former into it. After drying and vulcanisation, the film then contains an essentially uniform dispersion of the fine, particulate material. Such particles, usually 0.1 to 50 microns in diameter, are able to blunt and divert the tip of a growing tear and thus enhance tear strength. Among the materials first used for this purpose were polymer resins, for example, a hydrazine-formaldehyde resin formed in the latex in situ, and carboxylated synthetic rubber latex, such as carboxylated styrene-butadiene rubber (CSBR) or carboxylated acrylonitrile-butadiene rubber (CNBR) latex, which were added to the natural rubber latex. Carboxylated rubbers, polystyrene and copolymers of vinyl acetate have also been used, as have styrene-butadiene copolymers. U.K. patent specification no. 2,088,389 teaches the use of poly (vinyl chloride) (PVC) as an additive to prevulcanised natural rubber latex, and similar claims have also been made for PVC and its copolymers.

The above proposals all make use of finely divided organic polymers. An alternative approach uses fine-particle silica as the hard component of the film. Various types of silica may be used but the most effective are those of smallest primary particle size, such as the fumed silicas. Aqueous dispersions of hydrophilic fumed silica, marketed under the trade mark "Aerosil", are known for improving tensile strength and tear resistance in articles made form natural and synthetic rubber latices (Technical Bulletin Pigments, No. 33; Degussa A G, Postfach 110533, D-6000 Frankfurt 11, Germany; December 1982; see also, H. Esser and G. Sinn (Kautschuk und Gummi, 1960, 13, WT126-132). A similar material, known under the trade mark Cab-O-Sil, has also been described as useful in latex films for increasing tear resistance.

In all previous approaches, including those involving silica, the reinforcing agent has been added in particulate form to the rubber latex. We have found that this leads to certain disadvantages, particularly when using the above commercially available forms of particulate or colloidal silica. In particular, particulate materials, especially colloidal silica, when added to the latex tend to reduce the stability of the latex. Agglomeration frequently occurs, leading to large particles which may be visible to the eye. Colloidal silica is also generally expensive, and can only be obtained in dilute form (typically a 10-15% solution). This leads to increased transport and storage costs, and is inconvenient for latex compounding as further processing may be required, or other suitable measures may need to be taken so as to be able to incorporate into the latex the colloidal silica in the form supplied.

SUMMARY OF THE INVENTION

We have now found a way of producing reinforced rubber latex films which avoids, or substantially reduces, the aforesaid problems. In particular, we have devised a way of providing stable rubber latices from which reinforced rubber latex films having excellent tear strength may be produced.

According to the present invention there is provided a method of making a rubber latex, which method comprises providing a rubber latex and adding to the latex a solution of a reinforcing agent. The rubber latex is suitable for use in the production of reinforced rubber latex films and rubber articles, such as condoms, made from such films.

There is also provided a method of making a reinforced rubber latex film, which method comprises providing a rubber latex, adding to the latex a solution of a reinforcing agent, then forming a film from the latex.

The invention also encompasses a rubber latex comprising a solution of a reinforcing agent. The invention also provides a reinforced rubber latex film which has been made from such a rubber latex.

In another aspect, there is provided a reinforced rubber latex film obtainable by the method of the invention.

Rubber articles formed of rubber latex films of the invention are also provided, in particular condoms.

The invention also provides the use of a latex according to the invention in the manufacture of reinforced rubber films and articles.

In another aspect, the invention includes the use of a water-soluble silicate, for example sodium silicate, as a reinforcing agent for rubber latex films and articles made therefrom.

In a further aspect, the invention provides a method of making a reinforced rubber latex film, which method comprises providing a rubber latex; adding to the latex solution of a reinforcing agent; adjusting the pH; then forming a film from the latex.

In a preferred aspect, the invention provides a method of making a reinforced rubber latex film, which method comprises providing a rubber latex; adding a solution of a water-soluble silicate, then forming a film from the latex.

DETAILED DESCRIPTION OF THE INVENTION

Figure 1:
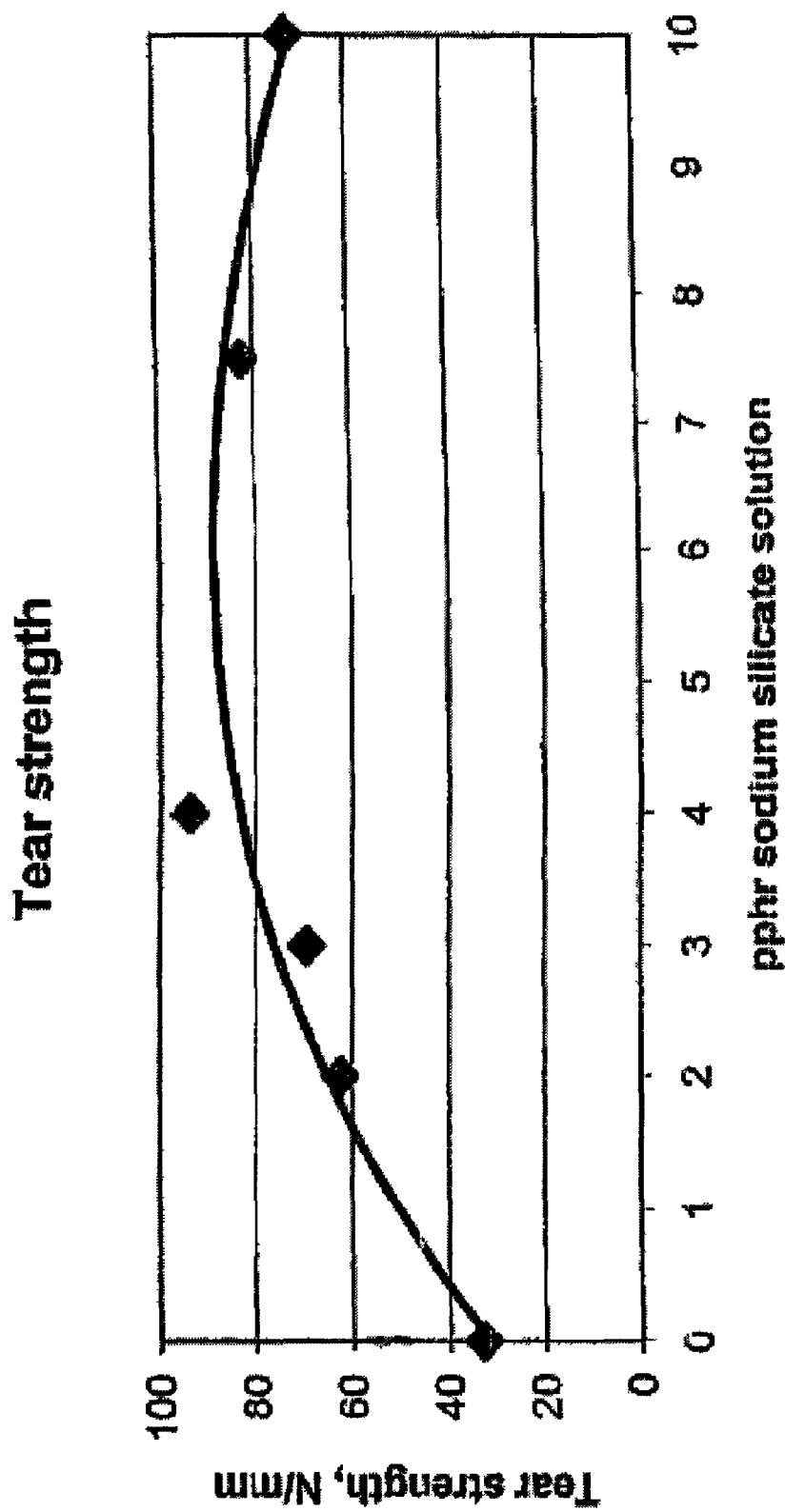
FIG. 1 is a plot of tear strength as a function of sodium silicate solution concentration.

Suitably, a film may be formed by dipping a shaped former into a rubber latex comprising the solution of reinforcing agent, then drying the latex deposit. The latex may be cured (vulcanised) if required, typically by heating. Alternatively, films of the invention may be made from a rubber latex of the invention by casting, or by the use of electrostatic spraying as described further in our European patent EP 946345. The techniques of forming rubber films by dipping or casting are well known to those skilled in the field of this invention.

Rubber latices produced by the method of the invention display good stability and unlike previous latices containing particulate reinforcing agents do not show any, or substantially any, reduction in latex stability. Rubber films produced from latices made as described herein show good tear strength, and this is retained on ageing of the film and during storage.

Preferred rubber latex films are those which are suitable for the manufacture of condoms or for the manufacture of gloves for domestic, medical, surgical or industrial use. Examples include surgeons' gloves, and medical examination gloves.

We prefer to add to the latex an aqueous solution of a water-soluble reinforcing agent. By reinforcing agent, we mean a component which will lead to an increase in the tear resistance of a rubber latex film when compared to a film made without that component. The term is well understood in the art. We prefer to use a solution of a water-soluble sodium silicate. Essentially, by use of a solution, the invention substantially overcomes the problems associated with the use of particulate reinforcing agents.

A preferred feature is to use a solution of a reinforcing agent wherein the pH of the solution is about 10 or above. This is particularly applicable to the water-soluble silicates. In a preferred aspect, an aqueous solution comprising from about 20% to 60% w/w of a water-soluble silicate is employed. An approximately 50% w/w solution of a water-soluble silicate is, for example, generally suitable.

In a preferred aspect, the latex is prevulcanised before addition of the reinforcing agent. We have found this leads to easier processability of the latex, and also gives films having greater tear strength.

We have also found that it can be advantageous, particularly for the water-soluble silicates, to reduce the pH of the latex after addition of the solution of reinforcing agent.

In the method of the present invention, the rubber latex is first produced; preferably in compounded form, and thereafter the solution of reinforcing agent is added to the latex. The reinforcing agent (or a precursor thereof) is in solution in the aqueous phase of the latex.

There are three basic compounding approaches to making latex films:
a) Unvulcanised Latex
   This is compounded (i.e. the chemicals that will effect cure are blended into the latex) without any heating, and then added to the dipping plant and the product dipped (or made into films by another process) and finally vulcanised (that is cured) on-plant.
b) Party Prevulcanised Latex
   The latex is compounded and prevulcanised at elevated temperature, allowed to mature and then compounded further if necessary before being added to the dipping plant and then dipped and vulcanisation completed.
c) Fully Prevulcanised Latex
   This is compounded and fully prevulcanised off-plant. It is then added the dipping plant and product dipped. No, or only limited vulcanisation takes place on the plant.

In the method of the invention, we prefer to use partly prevulcanised latex, to which is added the solution of reinforcing agent. In one preferred embodiment, the process, which is suitable for condoms for example, is as follows:
1. Prevulcanisation: add compounding ingredients to the latex and prevulcanise at elevated temperature until the appropriate swelling index is reached.
2. Maturation: cool to ambient temperature and add further vulcanising agent as appropriate, and allow the latex to mature at ambient until the appropriate swelling index is reached.
3. Final stage compounding (reserve): add more vulcanising agent as appropriate and heat at moderate temperature until the appropriate swelling index is reached.
4. Reserve adjustment: add reinforcing agent e.g. silicate solution to the fully compounded latex, mix and dilute if necessary to correct dipping viscosity; add to dipping plant.

We prefer to make latex films by "straight dipping", that is where no coagulation of the latex is used (by dipping into coagulant before the latex dipping).

The reinforcing agent can, in principle, be any suitable agent, although we prefer to use a water-soluble silicate. Preferably, a water-soluble sodium silicate is used.

Examples of suitable silicates include the following:

| Silicate | Structural formula | Empirical formula | Description |
|---|---|---|---|
| Sodium meta-disilicate | $2SiO_2 \cdot Na_2O$ | $Na_2Si_2O_5$ | Complex macro-$SiO_4^{4-}$ tetrahedra |
| Sodium tetrasilicate | $4SiO_2 \cdot Na_2O$ | $Na_2 \cdot Si_4O_9$ | Sheets of pseudo-hexagonally linked $SiO_4^{4-}$ tetrahedra |
| Sodium metasilicate | $SiO_2 \cdot Na_2O$ | $Na_2 \cdot SiO_3$ | Chains of singly linked $SiO_4^{4-}$ tetrahedra |
| Sodium orthosilicate | $SiO_2 \cdot 2Na_2O$ | $Na_4SiO_4$ | Discrete $SiO_4^{4-}$ tetrahedra |

Particularly suitable are a solution (approximately 50% w/w) of sodium meta-disilicate (supplied under the tradename Hollisil 26® by Holliday Chemical España SA), and a 48% sodium silicate solution supplied by Sigma-Aldrich Co., having empirical formula $Na_2Si_3O_7$.

The invention therefore also provides a rubber latex comprising a water-soluble reinforcing agent, preferably a water-soluble silicate, most preferably sodium silicate.

The rubber latex is preferably provided as a compounded rubber latex, as will be clear to those skilled in this particular field. Preferably, a solution of a water-soluble reinforcing agent is added to a compounded rubber latex. In particular, we prefer to add an aqueous solution, preferably a dilute aqueous solution, of sodium silicate to a compounded rubber latex. Sodium silicate has the advantage of being a relatively cheap and widely available material.

A general formulation suitable for the production of, for example, natural rubber latex condoms is:

| Ingredient Function | Range (pphr = parts per hundred rubber) |
|---|---|
| Latex | 100 |
| Stabilizers | 0.40-0.80 |
| Vulcanising agent | 0.45-0.75 |
| pH Adjuster | 0.05-0.10 |
| Vulcanising activator | 0.45-0.75 |
| Accelerator | 0.40-0.75 |
| Antioxidant | 0.15-0.25 |
| Reinforcing agent | 0.1-10 |
| Ammoniated water | As necessary |

For example, the above formulation may be used to make a compounded natural rubber latex containing a water-soluble silicate as the reinforcing agent. The remaining ingredients may be chosen as desired and suitable compounds are well known to those skilled in the art of latex compounding.

The amount of reinforcing agent on the compounded rubber latex can be any suitable amount provided the properties of the latex are not adversely affected, although we prefer to use an amount of from 0.1 to 10 pphr (parts per hundred parts rubber). Suitably, at least 2 pphr or above is used. These figures apply particularly to water-soluble silicates, where particularly good results have been achieved using amounts in the ranges 2-8 pphr and 3-7.5 pphr (see below).

In a preferred embodiment, a solution of sodium silicate is added to a compounded rubber latex. The pH of the latex may then be adjusted, for example lowered. For sodium silicate, the pH can, for example, be adjusted to be below about pH 10. Such conditions are, in fact, often encountered during film formation using compounded rubber latices.

We have found that the addition of an aqueous sodium silicate solution to a compounded rubber latex where the pH has been adjusted to 10 or 11 does not reduce the stability of the latex. Films having excellent tear strength can be obtained from such latices, and this strength is retained on ageing and storage.

In principle, the invention may be employed using any suitable rubber latex. We prefer to use natural rubber latex, but other latices, for example those based on carboxylated rubbers, such as carboxylated styrene-butadiene rubber and carboxylated acrylonitrile-butadiene rubber; nitrile rubbers, such as nitrile-butadiene rubber; and synthetic polyisoprene rubbers, as well as many other sorts or rubber, may be used. The manufacture of such rubber latices is well known and will not be further described.

Rubber articles such as condoms and gloves having good tear resistance before and after ageing or storage may be obtained from a rubber latex prepared according to the invention by dipping suitably prepared and shaped formers into the latex and drying and vulcanising (if required) the deposit so obtained. Depending on the type of article to be made, the former may be dipped more than once into the mixture or it may be dipped into a coagulant prior to immersion in the mixture, although a coagulant dip is not preferred. These and other variants are well known to those skilled in the art of latex dipping technology. The rubber is preferably natural rubber but as noted above other rubbers may be used.

In a preferred embodiment, the process of the invention includes one or more of the following features:
1. prevulcanisation—preferably prevulcanised for about 14 hours at about 60° C.
2. maturation—preferably cool the latex and add more zinc oxide (vulcanising agent) and mature at ambient temperature for about seven days.
3. reserve—final stage compounding—preferably add more zinc oxide and sulphur as appropriate and heat at about 40° C. for about 18 hours.
4. add reinforcing agent solution—preferably sodium silicate solution—and leave to stand then adjust viscosity before transfer to plant.

The process of the invention thus, in general, may include leaving the latex to stand after addition of the reinforcing agent, and adjusting the viscosity.

We have found that adding the reinforcing agent (e.g. sodium silicate at the reserve stage (i.e. after completion of prevulcanisation) gives better tear enhancement than adding it at the prevulcanisation stage and is easier to process.

The pH of the silicate solution is preferably pH 10 or more and is preferably added as a 50% solution in water. The latex is preferably allowed to stand after the silicate has been mixed in. The viscosity is then measured and adjusted if necessary before the latex is added to the dipping plant.

We have found that rubber latex films made in accordance with the method of the invention show advantages in comparison with films made using lattices comprising traditional particulate reinforcing agents. In particular, the modulus of the films of the invention is unaffected by use of a solution of reinforcing agent in the latex. Conversely, with particulate reinforcement, modules levels have been found to rise with the level of reinforcement. This is further illustrated in Examples 4 and 5 below.

EXAMPLES

The invention is further illustrated by the following Examples.

Example 1

Product (film) was made using the basic generalised formulation above, with different levels of sodium silicate solution ranging from 0-10 phr of 48% sodium silicate solution (sodium silicate solution from Sigma-Aldrich). The tear properties are illustrated in the table below, and are also shown graphically in FIG. 1.

| pphr sodium silicate solution | Tear strength (N/mm) |
|---|---|
| 0 | 32.9 |
| 2 | 62.3 |
| 3 | 69.4 |
| 5 | 93.9 |
| 7.5 | 82.5 |
| 10 | 72.2 |

Tear strength determined using un-nicked angle tear pieces (according to British Standard BS903 part A3). All data are the means of 10 measurements. Sodium silicate solution=48% w/w sodium silicate in water.

The superior tear strength observed when using sodium silicate above 2 pphr can be clearly seen.

Example 2

Product (film) was also made as in Example 1 using Hollisil 26 (sodium silicate) from Holiday Chemical España SA, which is 48% w/w solution—giving a sodium silicate loading of 2.392 pphr. This gave the following physical properties. The control data are from product made without the addition of sodium silicate solution to the latex. Whilst the majority of properties are comparable, the tear strength shows a more that doubling in value.

| Product | Tensile strength, MPa | Elongation-at-break, % | Burst volume, dm³ | Tear strength N/mm |
|---|---|---|---|---|
| Control | 29 | 834 | 47 | 44.4 |
| Reinforced | 33 | 907 | 40 | 100.5 |

Example 3

The films made according to Example 2 were subjected to accelerated ageing to determine how stable the enhancement in tear strength was and the results were:

| | Tensile strength, MPa | | | Tear strength, N/mm | | |
|---|---|---|---|---|---|---|
| Product | Initial | 2 days @ 70° C. | 28 days @ 70° C. | Initial | 7 days @ 70° C. | 28 days @ 70° C. |
| Control | 29 | 32 | 27 | 44 | 42 | 34 |
| Re-inforced | 33 | 34 | 28 | 101 | 85 | 61 |

The data demonstrate that the relative enhancement in tear strength is almost unaffected by accelerated ageing.

Example 4

Films were made from a formulation containing a sodium metasilicate (BDH sodium metasilicate obtained from VWR International). This was supplied as a solid and dissolved in water at 25% w/w before being added to the latex following the same process as for the sodium meta-disilicate (Example 2 above), to give a final content of 2.392 pphr sodium metasilicate (i.e. at the same level as for the sodium meta-discilicate).

The properties were as follows:

| Film | Tear strength N/mm | Stress (MPa) at x % strain | | |
|---|---|---|---|---|
| | | 100 | 300 | 500 |
| Control | 42 | 0.65 | 1.18 | 2.88 |
| 2.392 pphr sodium metasilicate | 89 | 0.61 | 1.07 | 2.22 |

As can be seen, the use of sodium metasilicate gave a significant enhancement in tear strength, whilst the modulus data (stress at specified strains) show that the inclusion of the silicate does not adversely affect modulus.

Example 5

The moduli of films made according to the invention was investigated further in relation to films made using traditional particulate reinforcing agent.

The measurement used, stress at x % strain, is a good indication of the comfort experienced by the condom user whilst wearing the condom. That is, the higher stress, the tighter condom feels and for some users this translates into increased discomfort.

Similarly, the higher the stress, the less easy it will be to unroll the condom onto the penis. Thus condoms with enhanced tear strength but without the expected concomitant increase in low strain moduli (or stress at x % strain) are to be preferred over condoms that have increased moduli. The table below compares the stress data for films made in accordance with the invention against those made in accordance with GB2321902 and demonstrates that the current films show no increase in stress over the values for the control condoms containing no silicates. By contrast, the GB2321902 Examples show increased stress over the control values.

| Formulation | Stress (MPa) at specified strains (%) | | |
|---|---|---|---|
| Aged 7 days @ 70° C. | 100 | 300 | 500 |
| Control | 0.62 | 1.19 | 2.35 |
| 2.392 pphr sodium meta-discilicate | 0.63 | 1.17 | 2.30 |
| 2.392 pphr sodium metasilicate | 0.62 | 1.16 | 2.29 |
| GB2321902 - Ex. 1 | 0.70 | 1.31 | 2.62 |
| GB2321902 - Ex. 2 | 0.69 | 1.30 | 2.60 |

Ex. 1 = 2 pphr Cab-O-Sperse Xplat 6
Ex. 2 = 1 pphr Cab-O-Sperse Xplat 6 + 1 pphr Lutofan LA951
Cab-O-Sperse Xplat 6 and Lutofan LA951 as described in GB 2321902.

The invention claimed is:

1. A method of making a reinforced rubber latex film, which method comprises providing a rubber latex, adding to the latex a solution of a reinforcing agent, wherein said solution of a reinforcing agent is a water soluble silicate then forming a film from the latex, wherein the amount of reinforcing agent in the latex is from 0.1 to 10 parts per hundred rubber (pphr).

2. The method according to claim 1 wherein the silicate is sodium silicate.

3. The method according to claim 2 wherein the silicate is sodium metasilicate or sodium meta-disilicate.

4. The method according to claim 1 wherein the pH of the solution added to the latex is about pH 10 or above.

5. The method according to claim 1 wherein the rubber latex is prevulcanised before addition of the solution of reinforcing agent.

6. The method according to claim 1 wherein, after addition of the solution of reinforcing agent, the pH of the latex is reduced below its initial value.

7. The method according to claim 1 wherein the amount of reinforcing agent is 2 pphr or above.

8. The method according to claim 1 wherein the solution is a 40-60% w/w aqueous solution of a water-soluble silicate.

9. The method according to claim 1 wherein the rubber latex film is formed by dipping, casting or electrostatic spraying.

10. A rubber latex suitable for forming a latex film, said latex comprising a solution of a reinforcing agent wherein said solution of a reinforcing agent comprises a water soluble silicate wherein the amount of reinforcing agent in the latex is from 0.1 to 10 parts per hundred rubber (pphr).

11. The latex according to claim 10 which latex is prevulcanised.

12. The rubber latex film formed from a latex according to claim 10.

13. A rubber article formed of a rubber latex film according to claim 12.

14. A condom formed of a rubber latex film according to claim 12.

15. A method comprising using a latex according to claim 10 in the manufacture of reinforced rubber films and articles.

16. A method comprising using a water-soluble silicate as a reinforcing agent for rubber latex films and articles made therefrom wherein the amount of reinforcing agent in the rubber latex film is from 0.1 to 10 parts per hundred rubber (pphr).

* * * * *